US012549848B2

(12) United States Patent
Yang et al.

(10) Patent No.: US 12,549,848 B2
(45) Date of Patent: Feb. 10, 2026

(54) ELECTRIC BICYCLE AND METHOD FOR DETECTING TRAFFIC ACCIDENT USING HELMET OF ELECTRIC BICYCLE

(71) Applicant: HUNAN XIBAODA INFORMATION TECHNOLOGY CO., LTD, Changsha (CN)

(72) Inventors: Feng Yang, Changsha (CN); Haihong Wei, Changsha (CN); Boyu Ouyang, Changsha (CN)

(73) Assignee: HUNAN XIBAODA INFORMATION TECHNOLOGY CO., LTD, Changsha (CN)

( * ) Notice: Subject to any disclaimer, the term of this patent is extended or adjusted under 35 U.S.C. 154(b) by 325 days.

(21) Appl. No.: 18/346,283

(22) Filed: Jul. 3, 2023

(65) Prior Publication Data

US 2024/0389701 A1 Nov. 28, 2024

Related U.S. Application Data

(63) Continuation of application No. PCT/CN2023/097867, filed on Jun. 1, 2023.

(30) Foreign Application Priority Data

May 23, 2023 (CN) .......................... 202310582718.5

(51) Int. Cl.
*H04N 23/65* (2023.01)
*G08B 21/02* (2006.01)
(Continued)

(52) U.S. Cl.
CPC ........... *H04N 23/651* (2023.01); *G08B 21/02* (2013.01); *G08G 1/04* (2013.01); *G08G 1/162* (2013.01); *H04N 23/61* (2023.01); *H04N 23/667* (2023.01)

(58) Field of Classification Search
None
See application file for complete search history.

(56) References Cited

U.S. PATENT DOCUMENTS

2012/0147186 A1* 6/2012 Choi .................... G07C 5/0866
  348/148
2015/0318015 A1* 11/2015 Bose .................... G08B 21/043
  386/248

(Continued)

FOREIGN PATENT DOCUMENTS

CN  213092434 U  4/2021
CN  113968302 A  1/2022
(Continued)

*Primary Examiner* — Paul M Berardesca
(74) *Attorney, Agent, or Firm* — Nitin Kaushik

(57) ABSTRACT

The present disclosure provide a method for detecting traffic accidents by using the helmet of an electric bicycle, and the method includes: acquiring real-time state information of the electric bicycle; controlling a camera mounted on a front of the helmet of the electric bicycle to enter a snapshot mode and acquiring environment image information captured by the camera according to a first preset time interval in response that the electric bicycle is in the started state; and in response that the environment image information comprises the preset traffic accident image, controlling the camera to enter a first video recording mode, and sending the environment image information of a first preset period of time recorded by the camera and/or a first warning command to a first target object after waiting for the first preset period of time.

14 Claims, 7 Drawing Sheets

(51) Int. Cl.
  *G08G 1/04* (2006.01)
  *G08G 1/16* (2006.01)
  *H04N 23/61* (2023.01)
  *H04N 23/667* (2023.01)

(56) References Cited

U.S. PATENT DOCUMENTS

2017/0295319 A1* 10/2017 Komemushi .......... H04N 5/907
2021/0076009 A1*  3/2021 Choi ................... G06V 20/40
2022/0132029 A1*  4/2022 Watanabe ............ H04N 23/951
2023/0302325 A1*  9/2023 Bentley .............. A63B 24/0062
2025/0091611 A1*  3/2025 Li ...................... H04N 23/667

FOREIGN PATENT DOCUMENTS

| | | | |
|---|---|---|---|
| CN | 216901717 U | * | 7/2022 |
| CN | 218737437 U | | 3/2023 |
| JP | 2004164315 A | * | 6/2004 |
| WO | WO-2024170542 A1 | * | 8/2024 ............. B62J 50/25 |

\* cited by examiner

ELECTRIC BICYCLE AND METHOD FOR DETECTING TRAFFIC ACCIDENT USING HELMET OF ELECTRIC BICYCLE

CROSS-REFERENCE TO RELATED APPLICATIONS

The application claims priority to Chinese patent application No. 2023105827185, filed on May 23, 2023, the entire contents of which are incorporated herein by reference.

TECHNICAL FIELD

The present disclosure relates to a field of traffic accident detection technology, in particular to an electric bicycle and method for detecting traffic accident using a helmet of the electric bicycle.

BACKGROUND

With more and more infrastructure in a road transportation network and higher living standards, cars and shared electric bicycles have become important means of transportation for many households/users. With an increase of cars and shared vehicles, traffic accidents occur frequently. Once the traffic accidents occur, there may be casualties, which need to be discovered and rescued in time.

In the prior art, a method for detecting the traffic accidents is mainly based on manual operation. That is, some relevant staff members watching monitoring videos from a monitoring equipment of a road section to find image information of the traffic accidents, and then report the monitoring video or the image information to a traffic management department to dealing with the traffic accidents. Due to factors such as the small number of the staff members, the detection and analysis of traffic accidents in a manual manner has obvious hysteresis. On the one hand, the best time for rescue the casualties of the traffic accident may be delayed, and on the other hand, the detection efficiency is obviously low.

In addition, as the number of the shared electric bicycles is huge and using the shared electric bicycles is very convenient and frequent. However, in the prior art, there is no method for detecting traffic accidents by using characteristics of the shared electric bicycles.

In view of this, it is necessary to provide a method for detecting the traffic accident by using a helmet of an electric bicycle and the electric bicycle to solve or at least alleviate the above defects.

SUMMARY

A main purpose of the present disclosure is to provide a method for detecting traffic accidents by using the helmet of an electric bicycle and the electric bicycle to solve the problem that the detection of traffic accidents is still based on manual operation, which has obvious lag and low detection efficiency.

In order to achieve he above purpose, the present disclosure provides a method for detecting traffic accidents by using the helmet of an electric bicycle, and the method includes: acquiring real-time state information of the electric bicycle and determining whether the electric bicycle is in a started state according to the real-time state information; controlling a camera mounted on a front of the helmet of the electric bicycle to enter a snapshot mode and acquiring environment image information captured by the camera according to a first preset time interval in response that the electric bicycle is in the started state; determining whether the environment image information comprises a preset traffic accident image; and in response that the environment image information comprises the preset traffic accident image, controlling the camera to enter a first video recording mode, and sending the environment image information of a first preset period of time recorded by the camera and/or a first warning command to a first target object after waiting for the first preset period of time.

In an embodiment, wherein controlling the camera to enter the first video recording mode, and sending the environment image information of the first preset period of time recorded by the camera and/or the first warning command to the first target object after waiting for the first preset period of time further comprises: determining a traffic accident evaluation level corresponding to the preset traffic accident image according to the preset traffic accident image; determining whether the traffic accident evaluation level is greater than a preset severity level; in response that the traffic accident evaluation level is greater than the preset severity level, controlling the camera to enter the first video recording mode and obtaining a current speed of the electric bicycle and a separation distance between the electric bicycle and a position of the traffic accident; determining a theoretical calculation period of time of the electric bicycle when the electric bicycle moves from a current position to the position of the traffic accident and setting the theoretical calculation period of time as a first preset period of time; and after waiting for the first preset period of time, sending to the first target object the environmental information recorded by the camera in the first preset period of time, the traffic accident evaluation level and the current position of the electric bicycle; in response that the traffic accident evaluation level is less than or equal to the preset severity level, controlling the camera to enter the first video recording mode and recording the environment information video that is obtained by the camera within a second preset period of time after entering the first video recording mode, and determining whether the environment information node video corresponding to a first time node at the end of the second preset period of time has the preset traffic accident image; in response that the environment information node video corresponding to the first time node at the end of the second preset period of time has the preset traffic accident image, adjusting the second preset period of time to a third preset period of time and setting the adjusted third preset period of time as the first preset period of time; and after waiting for the first preset period of time, sending to the first target object the environmental information recorded by the camera in the first preset period of time, the traffic accident evaluation level and the current position of the electric bicycle.

In an embodiment, the method further comprising: acquiring a real-time running speed of the electric bicycle, and determining whether the electric bicycle is in a static state according to the real-time running speed in response that the environment image information does not have the preset traffic accident image; in response that the electric bicycle is in the static state, acquiring attitude information of the electric bicycle detected by a tilt angle detection device of the electric bicycle and obtaining a vertical distance between the camera and ground; determining whether the electric bicycle is in a tipped state according to the attitude information of the electric bicycle and determining whether the vertical distance is less than a preset threshold value; controlling the camera to enter a second video recording mode in response that the electric bicycle is in the tipped state, or the vertical distance is less than the preset threshold value, and obtaining environmental information video recorded by the camera within a fourth preset period of time after the camera entering the second video recording mode, and determining whether the electric bicycle is in the tipped state and whether the vertical distance between the camera and the ground is less than the preset threshold value at a second time node at the end of the fourth preset period of time; sending the obtained environmental information video and/or a second warning command to a selected operation and maintenance people in response that the electric bicycle is in the tipped state or the vertical distance is less than the preset threshold value; maintaining the camera in the snapshot mode in response that the electric bicycle is not in the tipped state and the vertical distance is greater than or equal to the preset threshold value.

In an embodiment, the method further comprising: in response that the electric bicycle is in the tipped state and the vertical distance is less than the preset threshold value, determining that the electric bicycle is at a serious traffic accident level and sending the environmental information video recorded by the camera in the fourth preset period of time and a third warning command to a second target object.

In an embodiment, the method further comprising: in response that the environment image information does not have the preset traffic accident image, acquiring an angle change rate of the helmet detected by an inclination detection device and obtaining a speed change rate of the electric bicycle, and determining whether the angle change rate is greater than a first preset threshold value in a first predetermined period of time, and determining whether the speed change rate of the electric bicycle is greater than a second preset threshold value in a second predetermined period of time; determining that the electric bicycle is at a serious traffic accident level in response that the angle change rate is greater than the first preset threshold value within the first predetermined period of time or the speed change rate of the electric bicycle is greater than the second preset threshold value within the second predetermined period of time, and sending environment image information recorded by the camera within a predetermined period of time and a third warning command to a second target object; in response that the angle change rate is less than the first preset threshold value within the first predetermined period of time and the speed change rate of the electric bicycle is less than the second preset threshold value within the second predetermined period of time, continuing to acquire the angle change rate of the helmet detected by an inclination detection device and obtain the speed change rate of the electric bicycle.

In an embodiment, the method further comprising: in response that the environment image information does not have the preset traffic accident image, determining whether the environment image information has a target obstacle or not; and adjusting the first preset time interval to a second preset time interval when the target obstacle is present in the environment image information, and the second preset time interval is less than the first preset time interval.

In an embodiment, the method further comprising: determining whether the corresponding environment image information has a target obstacle from a third time node at the end of a fifth preset period of time after the first detection of the target obstacle; adjusting the second preset time interval to the first preset time interval in response that the environment image information does not have the target obstacle; and maintaining the camera to continue capturing images according to the second predetermined time interval in response that the environmental image information has the target obstacle.

In an embodiment, the method further comprising: obtaining historical position data of the electric bicycle for a sixth preset period of time prior to the current moment and determining a vector motion path of the electric bicycle based on the historical position data; determining whether there is a target shared vehicle behind the electric bicycle and within a preset range from a current position of the electric bicycle according to the current position of the electric bicycle at the current moment and the vector motion path; wherein target shared vehicle is in communication connection with the electric bicycle; and sending a fourth warning command to the target shared vehicle in response that the target shared vehicle is behind the current electric bicycle and within the preset range from the current position.

In an embodiment, the operation and maintenance people is selected by: obtaining a real-time position of the electric bicycle, and obtaining an operation and maintenance task from each of a plurality of alternate operation and maintenance people whose distance from the real-time position is within a preset range according to the real-time position of the electric bicycle, and a plurality of distances between the alternate operation and maintenance people and the real-time position; determining at least one alternate operation and maintenance people whose distance is within the preset range and the task of the alternate operation and maintenance people is less than a preset amount of task from the plurality of alternate operation and maintenance people as the selected operation and maintenance people; and randomly selecting one of the at least one alternate operation and maintenance people as the selected operation and maintenance people if the number of the determined operation and maintenance people is plural.

The present disclosure further provides an electronic bicycle comprising: a body; a helmet; and a control system installed in the body; wherein the body is also provided with a tilt angle sensor for detecting attitude information of the electric bicycle and the tilt angle sensor is electrically connected with the control system; the helmet is provided with a communication device that is used to establish communication with the control system and a camera for acquiring riding environment images that is equipped in front of the helmet; the control system comprises a storage device, a processor, and a computer program stored in the storage device and capable of running on the processor, and when the processor executes the computer program, the method for detecting the traffic accident using a helmet of the electric bicycle as claimed in any one of claims 1 to 9 is implemented.

Compared with prior art, the present disclosure has the following beneficial effects: the present disclosure provides a method for detecting traffic accident using a helmet of an electric bicycle and the electric bicycle. The method comprises the following steps: acquiring real-time state information of the electric bicycle and determining whether the electric bicycle is in a started state according to the real-time state information; controlling a camera mounted on a front of the helmet of the electric bicycle to enter a snapshot mode and acquiring environment image information captured by the camera according to a first preset time interval in response that the electric bicycle is in the started state; determining whether the environment image information comprises a preset traffic accident image; and in response that the environment image information comprises the preset traffic accident image, controlling the camera to enter a first video recording mode, and sending the environment image information of a first preset period of time recorded by the camera and/or a first warning command to a first target object after waiting for the first preset period of time. In this way, the traffic accident image information captured by the camera can be detected and uploaded immediately, with high timeliness and high detection efficiency.

In addition, when the preset traffic accident image is provided in the environment image information, the traffic accident evaluation level corresponding to the preset traffic accident image is determined according to the preset traffic accident image, and whether the traffic accident evaluation level is greater than the preset serious level is determined to carry out emergency key treatment on the serious traffic accident, and meanwhile, the situation of the traffic accident of the electric bicycle itself is also taken into consideration, and the related treatment is carried out when the traffic accident occurs on the electric bicycle, so as to carry out timely rescue.

BRIEF DESCRIPTION OF THE DRAWINGS

In order to illustrate more clearly the embodiments of the present disclosure or the technical proposals in the prior art, the accompanying drawings required for use in the examples or descriptions of the prior art will be briefly described, and it will be apparent that the accompanying drawings described below are merely some embodiments of the present disclosure, and that other accompanying drawings may be obtained from the structure shown in these drawings without the effort of creativity by one of ordinary skill in the art.

DETAILED DESCRIPTION OF THE EMBODIMENTS

Figure 1:
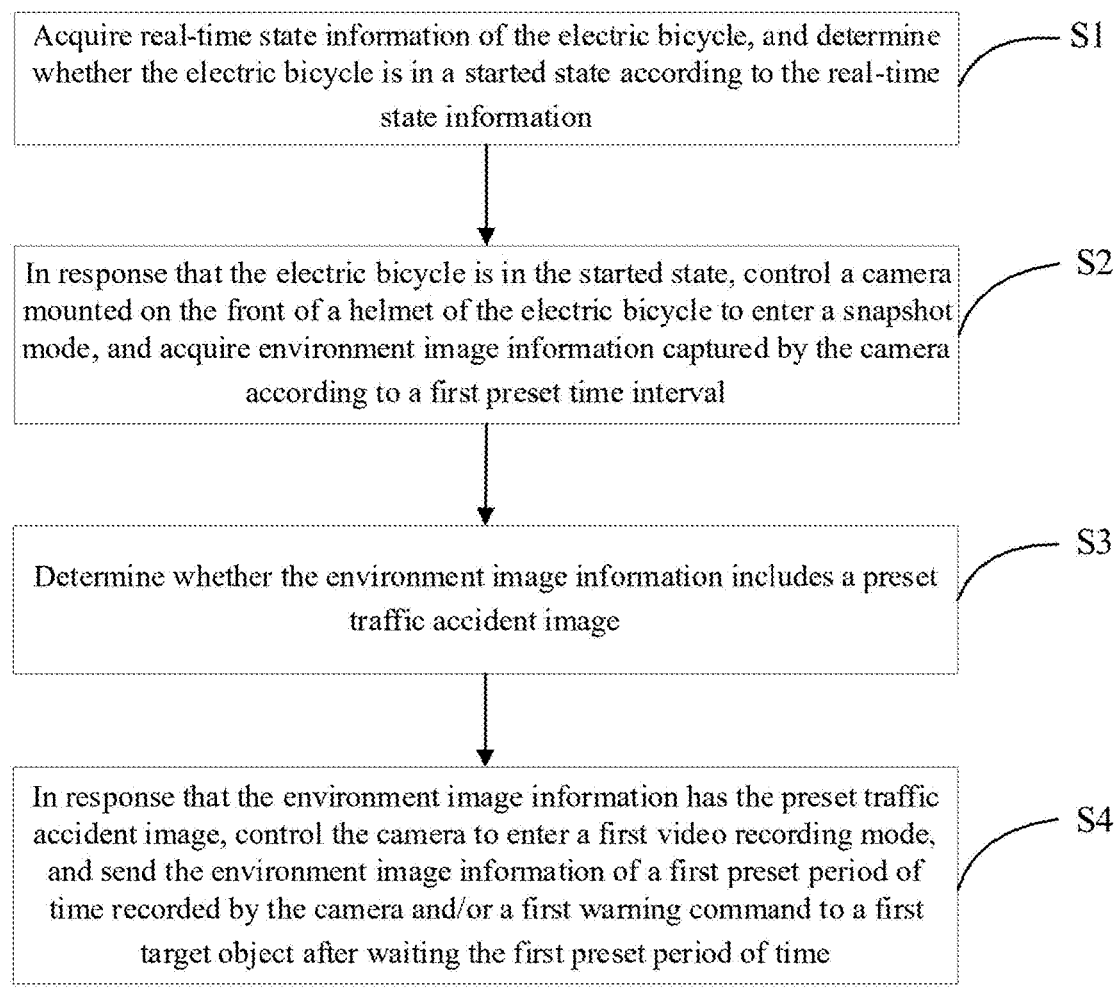
FIG. 1 is a flowchart of an embodiment of a method for detecting traffic accident using helmet of an electric bicycle.

It should be understood that the specific embodiments described herein are merely intended to explain the present disclosure and are not intended to limit it.

The following will be a clear and complete description of the technical aspects of the embodiments of the present disclosure, taken in conjunction with the accompanying drawings of the embodiments of the present disclosure, it being evident that the embodiments described are only part of the embodiments of the present disclosure, and not the entire embodiment. Based on the implementations in the application, all other implementations obtained by a person of ordinary skill in the art without paying any creative labor fall within the protection scope of this application.

It should be noted that in embodiments of the present disclosure all directionality indicators (such as up, down, left, right, front, back and so on) is only used to explain the relative positional relationship, movement, etc. between the components under a particular attitude (as shown in the drawings), and if the particular attitude changes, the directivity indication changes accordingly.

Further, the description of "first", "second" and the like referred to in the present disclosure is for descriptive purposes only and is not to be construed as indicating or implying relative importance thereof or implying an indication of the number of technical features indicated. Thus, a feature defining "first" and "second" may include, either explicitly or implicitly, at least one of the features. In addition, the various embodiments of the technical solutions can be combined with each other, but must be based on the ability of those of ordinary skill in the art to achieve, when the combination of technical solutions appear contradictory or impossible to achieve, it should be considered that the combination of such technical solutions does not exist, and is not within the protection scope of the present disclosure.

Figure 2:
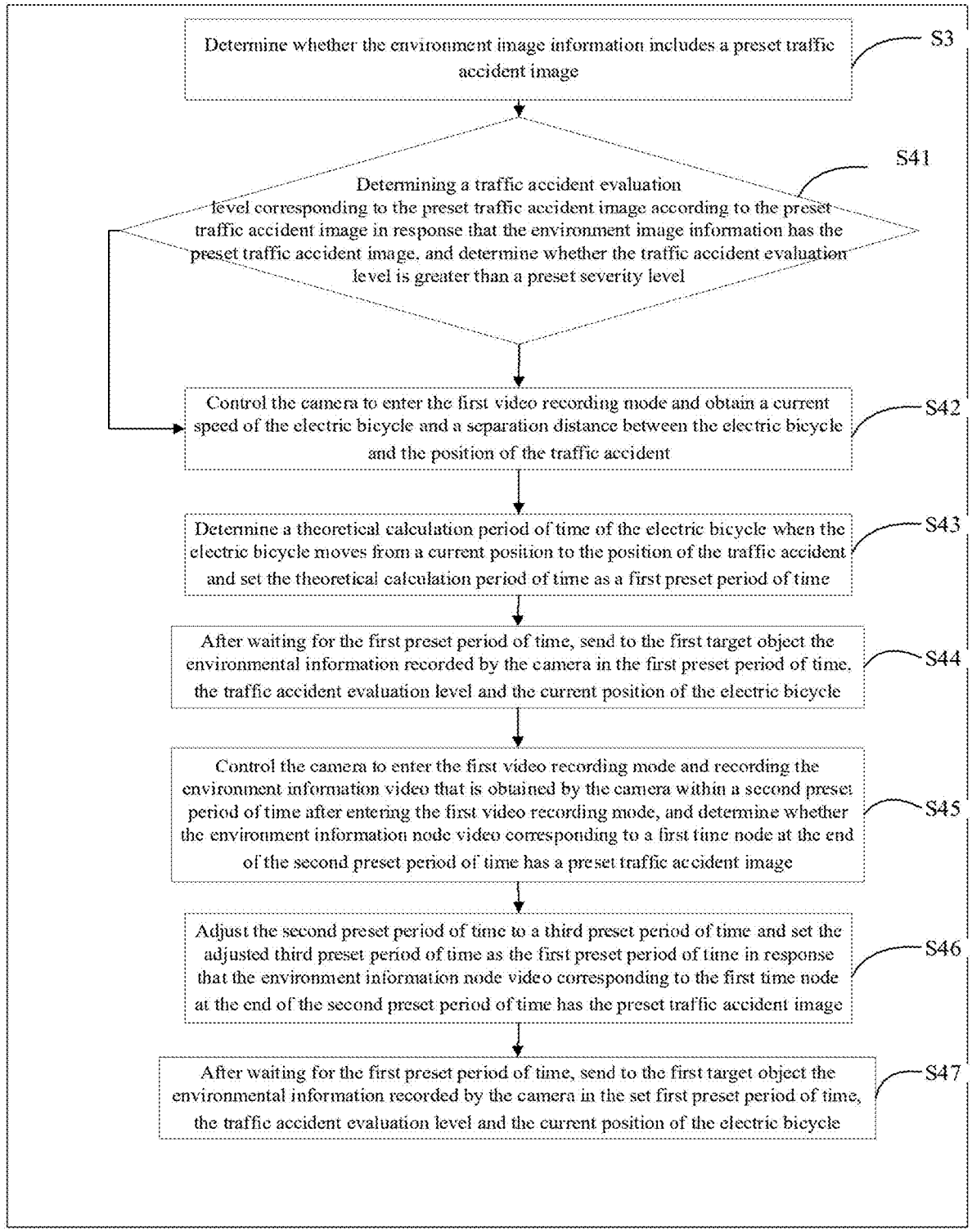
FIG. 2 is a flowchart of an embodiment of step S4 of a method for detecting traffic accident using helmet of an electric bicycle shown in FIG. 1.
Figure 3:
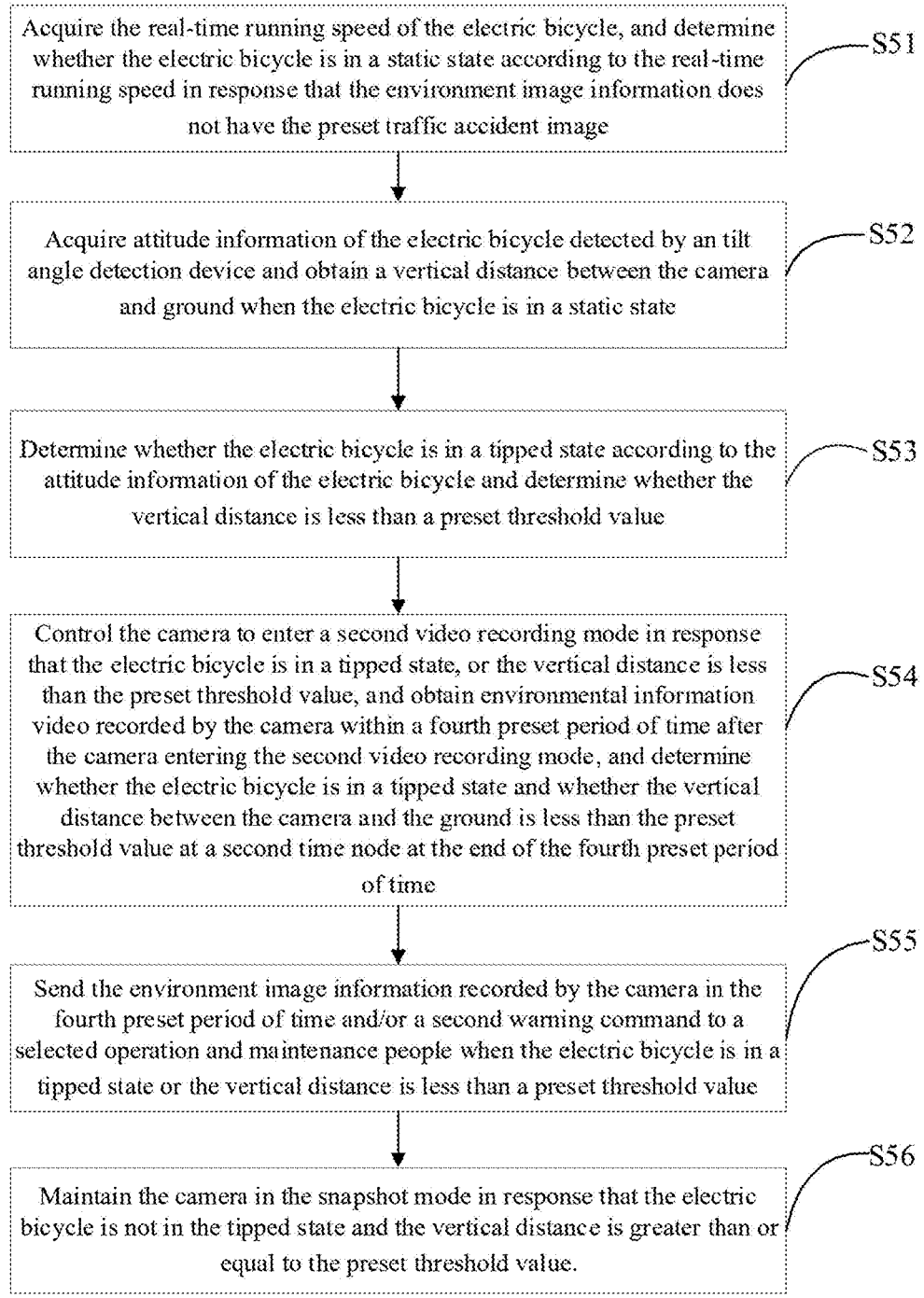
FIG. 3 is a flowchart of a step S3 further comprising steps in one embodiment of the present disclosure.
Figure 4:
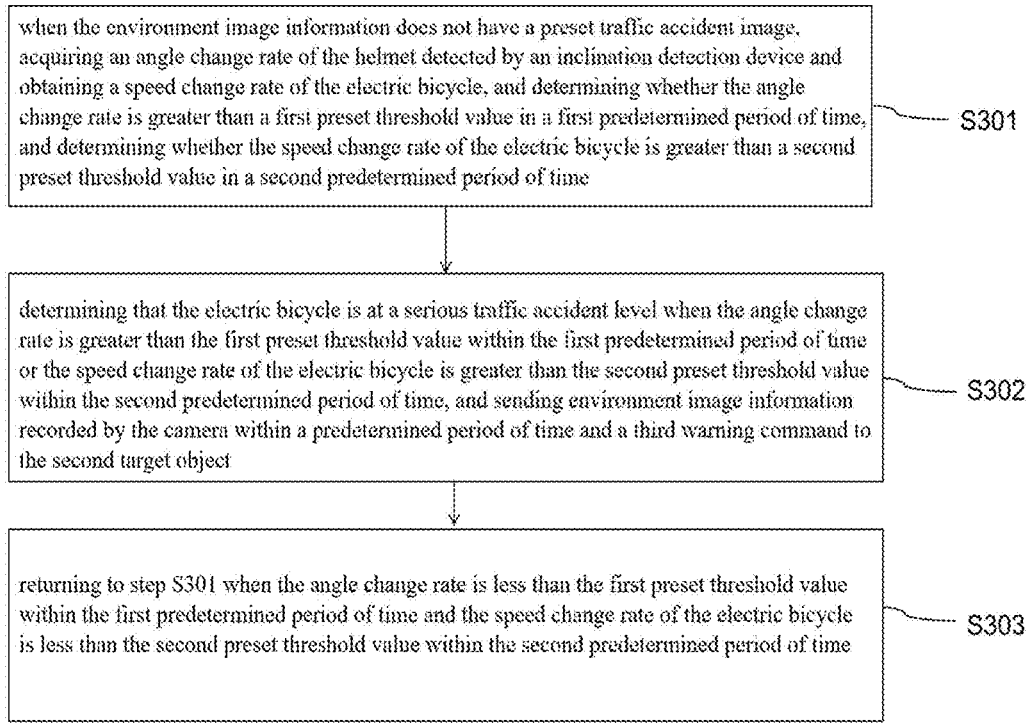
FIG. 4 is a flowchart of a step S3 further comprising steps in other embodiment of the present disclosure
Figure 5:
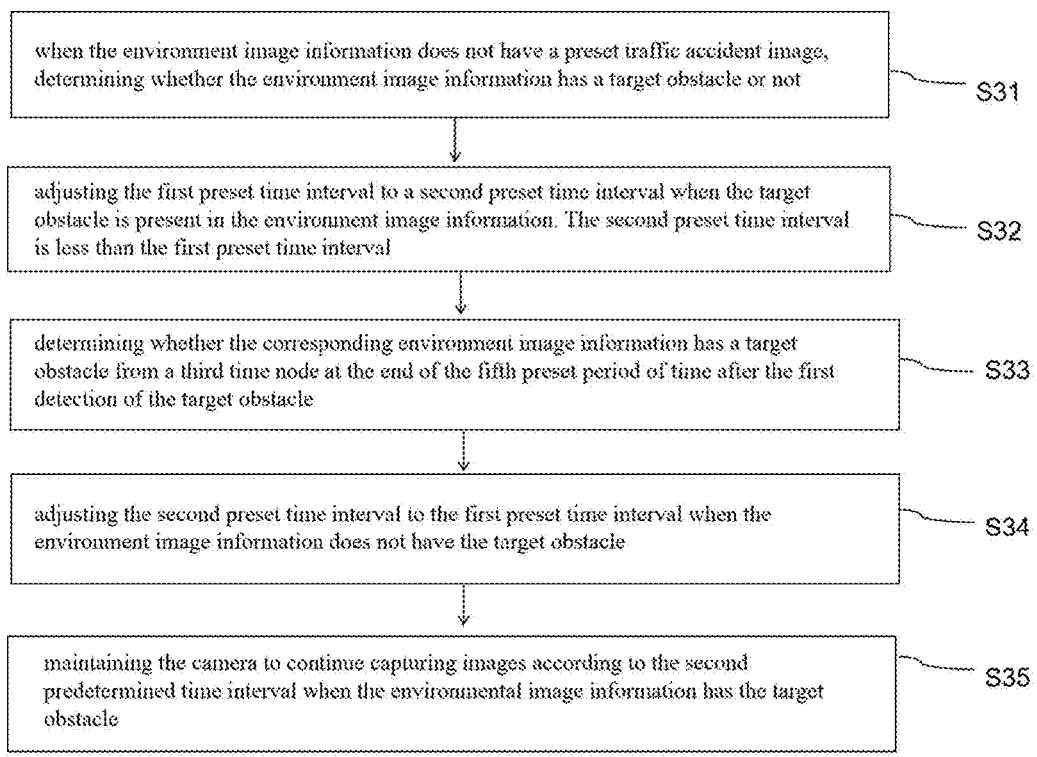
FIG. 5 is a flowchart of the additional steps included after step S3 in one embodiment of the present disclosure
Figure 6:
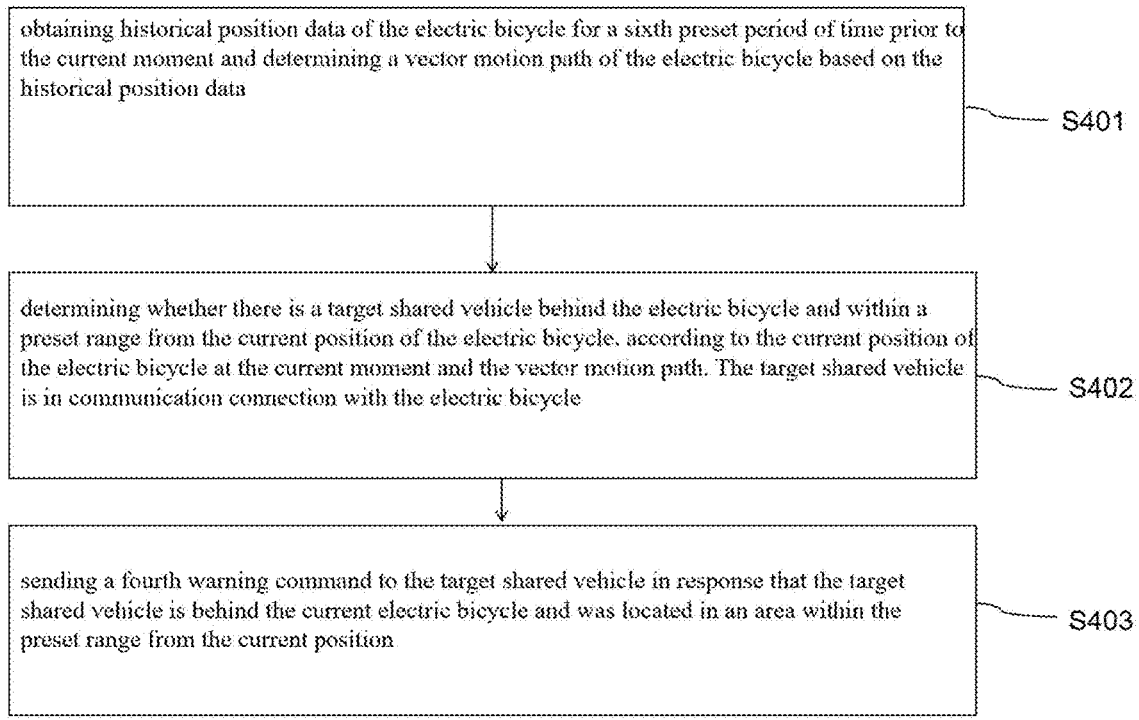
FIG. 6 is a flowchart of the additional steps included after step S4 in one embodiment of the present disclosure
Figure 7:
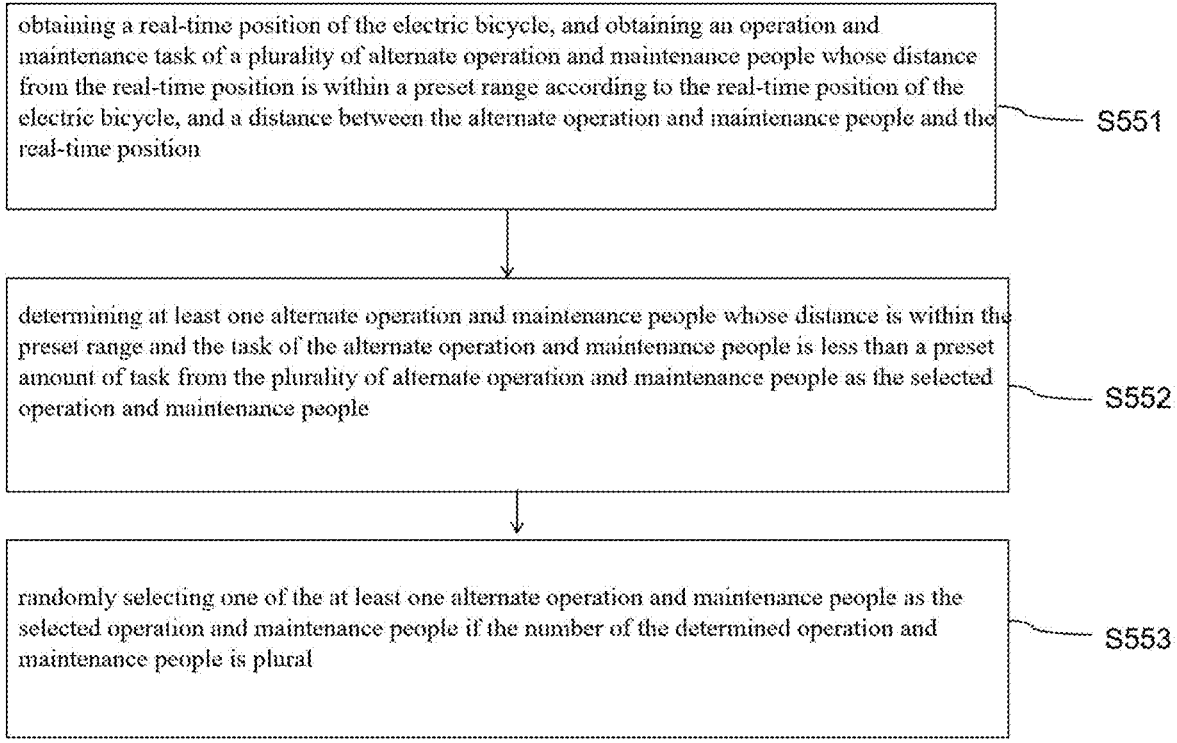
FIG. 7 is a flowchart of the steps by which the "select operation and maintenance people" in step S55 is obtained in one embodiment of the present disclosure The object implementation, functional features and advantages of the present disclosure will be described further with reference to the accompanying drawings in conjunction with embodiments.

Referring to FIG. 1 to FIG. 37, FIG. 1 to FIG. 37 illustrate some flowcharts of a method for detecting the traffic accidents by using a helmet of an electric bicycle. The method can include the following steps:

In step S1, acquiring real-time state information of the electric bicycle, and determining whether the electric bicycle is in a started state according to the real-time state information. For example, by detecting whether an output current of the electric bicycle is greater than a preset threshold to determine whether the electric bicycle is in the started state. Or by detecting an electrification condition of the electric bicycle to determine whether the electric bicycle is in a started state. For example, if an output current of the electric bicycle is greater than the preset threshold, the electric bicycle is in the started state. If an output current of the electric bicycle is equal to or lower than the preset threshold, the electric bicycle is not in the started state. A person skilled in the art can set according to actual needs.

In step S2, in response that the electric bicycle is in the started state, controlling a camera mounted on the front of a helmet of the electric bicycle to enter a snapshot mode, and acquiring environment image information captured by the camera according to a first preset time interval.

It can be understood that the camera includes a capture mode and a video recording mode, and that the camera in this application is positioned in front of the helmet for capturing environmental image during riding. The first preset time interval can be set as required. For example, the first preset time interval can be set as 2 seconds, that is, one of the environment image information is captured every 2 seconds.

In step S3, determining whether the environment image information includes a preset traffic accident image. It is worth noting that there can be various ways to determine whether there is preset traffic accident image in the environment image information. For example, by setting the preset traffic accident image in advance through an image template matching algorithm. For example, setting the images include obvious image characteristics such as detected blood stains, vehicle debris, vehicle crushing, and so on, as the preset traffic accident images. And then matching the current environment image information and the preset traffic accident image through the image template matching algorithm to generate a matching degree. When the matching degree is larger than a preset value, the current environment image information can be considered to have the preset traffic accident image between the templates. In another embodiment, whether there is a preset traffic accident image in the environment image information can be detected by means of deep learning. For example, by collecting a plural or a sufficient number of image samples in advance, all the image samples are divided into a training set and a testing set, and each image sample is manually labeled (that is, whether it corresponds to a preset traffic accident image) and trained into a neural network model with high accuracy, and then predicted or detected by using the trained neural network model. This method of neural network detection is a mature technology of the prior art and is not described too much here.

In step S4, in response that the environment image information has the preset traffic accident image, controlling the camera to enter a first video recording mode, and sending the environment image information of a first preset period of time recorded by the camera and/or a first warning command to a first target object after waiting the first preset period of time. The first preset period of time can be set as 10 seconds, and the first target object can be one or more of a user corresponding to the electric bicycle, a background management system, a traffic management department system, a medical system and a shared electric bicycle operation and maintenance personnel. The first warning command can include the environment image information, a real-time position and time information corresponding to the electric bicycle, and so on.

In at least one embodiment of the present disclosure, by acquiring the real-time state information of the electric bicycle and determining whether the electric bicycle is in the started state according to the real-time state information. When the electric bicycle is in the started state, a camera mounted on the front of the helmet of the electric bicycle is controlled to enter the snapshot mode, and the environment image information captured by the camera is obtained according to a first preset period of time, and whether the environment image information has a preset traffic accident image is determined. When the environment image information has the preset traffic accident image, the camera is controlled to enter the first video recording mode, and after waiting for the first preset period of time, the environment image information recorded by the camera in the first preset period of time and/or the first warning command are sent to the first target object. The present disclosure can detect an external environment of the electric bicycle and whether the electric bicycle has a traffic accident or not and has high timeliness and detection efficiency.

At least one embodiment of the present disclosure, the step S4 specifically includes the following steps:

In step S41, determining a traffic accident evaluation level corresponding to the preset traffic accident image according to the preset traffic accident image in response that the environment image information has the preset traffic accident image, and determining whether the traffic accident evaluation level is greater than a preset severity level. In response that the traffic accident evaluation level is greater than the preset severity level, the method executing steps S42 to S44. In response that the traffic accident evaluation level is less than or equal to the preset severity level, the method executing steps S45 to S47. Specifically, the traffic accident evaluation level corresponding to the preset traffic accident image can be determined through the preset traffic accident image, and the traffic accident evaluation level corresponding to the preset traffic accident image can be determined through calculation, such as material evidence that can reflect a serious traffic accident (such as vehicle residue, vehicle crushing and creases, blood stains, personnel falling to the ground, and the like), or the traffic accident evaluation level corresponding to the traffic accident image can also be determined by performing a neural network algorithm, such as collecting a sufficient number of historical sample pictures, labeling each image (corresponding accident evaluation level), dividing the historical sample pictures into training sets and testing sets, training to obtain a trained neural network model, and detecting the current traffic accident image through the neural network model.

In step S42, controlling the camera to enter the first video recording mode and obtaining a current speed of the electric bicycle and a separation distance between the electric bicycle and the position of the traffic accident. It should be noted that the position of the traffic accident can be determined from the traffic accident images, which have the most serious areas in the traffic accident image.

In step S43, determining a theoretical calculation period of time of the electric bicycle when the electric bicycle moves from a current position to the position of the traffic accident and setting the theoretical calculation period of time as a first preset period of time. The theoretical calculation period of time is equal to a period of time when the electric bicycle moves from the current position to the position of the traffic accident. In other words, a recording period of time of the camera in the first recording mode is equal to the period of time from current moment to when the electric bicycle arrived at the position of the traffic accident, during which sufficient image information of the traffic accident scene can be collected.

In step S44, after waiting for the first preset period of time, sending to the first target object the environmental information recorded by the camera in the first preset period of time, the traffic accident evaluation level and the current position of the electric bicycle. By sending the environmental information recorded by the camera in the first preset period of time, the traffic accident evaluation level and the current position of the electric bicycle to the first target object, the traffic accident scene images can be timely sent to the target object, and then recorded, tracked and subsequently processed the traffic accident.

In step S45, controlling the camera to enter the first video recording mode and recording the environment information video that is obtained by the camera within a second preset period of time (e.g., 30 s) after entering the first video recording mode, and determining whether the environment information node video corresponding to a first time node at the end of the second preset period of time has a preset traffic accident image. It should be noted that when the traffic accident evaluation level is less than or equal to the preset severity level, it indicates that the camera may not detect the traffic accident or that the traffic accident is relatively light at this time, and such situations need to be further detected at this time. That is, recording the environmental information video obtained by the camera within a second preset period of time after entering the first video recording mode, and determining whether the environmental information node video corresponding to the first time node at the end of the second preset period of time has a preset traffic accident image. In other words, the camera continuously records and detects the environmental information within 30 s. intercepting the environmental information node video again at the end of 30 s, and determines whether the environmental information node video has the preset traffic accident image. It indicates that the traffic accident still exists within 30 s in response that the environmental information node video has the preset traffic accident image. And in order to further determine the seriousness of the accident by the method, the method performs subsequent steps for detection.

In step S46, adjusting the second preset period of time to a third preset period of time (e.g., 1 min) and setting the adjusted third preset period of time as the first preset period of time in response that the environment information node video corresponding to the first time node at the end of the second preset period of time has the preset traffic accident image. When the environment information node video corresponding to the first time node at the end of the second preset period of time has the preset traffic accident images, the traffic accident at this time is more serious and the detection time need to be extended.

In step S47, after waiting for the first preset period of time, sending to the first target object the environmental information recorded by the camera in the set first preset period of time, the traffic accident evaluation level and the current position of the electric bicycle. In other words, after adjusting the first preset period of time, the first preset period of time changes to one minute and thirty seconds, thereby increasing the detection time and thus recording more environmental information.

At least one embodiment of the present disclosure, the step S3 further includes the following steps:

In step S51, acquiring the real-time running speed of the electric bicycle, and determining whether the electric bicycle is in a static state according to the real-time running speed in response that the environment image information does not have the preset traffic accident image. It is worth noting that when there is no preset traffic accident image in the environment image information, there are two situations exists, for example, the electric bicycle may have a traffic accident, or the electric bicycle may not have a traffic accident. In order to accurately determine whether the electric bicycle has a traffic accident, the embodiment of the present disclosure obtains a real-time running speed and determines whether the electric bicycle is in a static state according to the real-time running speed, for example, when the real-time running speed is 0, the electric bicycle can be determined to be in a static state.

In step S52, acquiring attitude information of the electric bicycle detected by an tilt angle detection device (e.g., an tilt angle sensor) and obtaining a vertical distance between the camera and ground when the electric bicycle is in a static state. The tilt angle detection device is installed in the body of the electric bicycle. It will be appreciated that existing shared electric bicycles are typically equipped with inclination detection devices (e.g., gyroscopes, etc.) capable of detecting the attitude information of the electric bicycles. For example, the tilt angle detection device is able to determine whether the electric bicycle is in a tipped state. According to the existing mature image processing algorithm, the vertical distance between the camera and the ground can be determined by the Euclidean distance method, for example. It should also be noted that if the environment image information does not have the ground, the distance between the camera and the ground is infinite.

In step S53, determining whether the electric bicycle is in a tipped state according to the attitude information of the electric bicycle and determining whether the vertical distance is less than a preset threshold value.

In step S54, controlling the camera to enter a second video recording mode in response that the electric bicycle is in a tipped state, or the vertical distance is less than the preset threshold value, and obtaining environmental information video recorded by the camera within a fourth preset period of time (such as 2 minutes) after the camera entering the second video recording mode, and determining whether the electric bicycle is in a tipped state and whether the vertical distance between the camera and the ground is less than the preset threshold value at a second time node at the end of the fourth preset period of time. That is, the electric bicycle is in a tipped state, and the helmet falls to the ground if the electric bicycle is in a tipped state, or the vertical distance is less than the preset threshold value. And after 2 minutes, the electric bicycle is still in the tipped state, or the helmet is still in the ground, it can be determined that the electric bicycle may be in a random parking state, or a traffic accident has occurred. At this time, subsequent steps need to be performed to further confirm the two states.

In step S55, sending the environment image information recorded by the camera in the fourth preset period of time and/or a second warning command to a selected operation and maintenance people when the electric bicycle is in a tipped state or the vertical distance is less than a preset threshold value. That is, when the electric bicycle is in a random parking state for a long time or the helmet falls on the ground for a long time, sending the environment image information recorded by the camera in the fourth preset period of time and/or the second warning command to the selected operation and maintenance people regardless of the situation, so as to facilitate the selected operation and maintenance people to process the situation in time.

In step S56, maintaining the camera in the snapshot mode in response that the electric bicycle is not in the tipped state and the vertical distance is greater than or equal to the preset threshold value. That is, when the electric bicycle is not in a tipped state and the helmet is not falls on the ground, indicating that at this time, the electric bicycle does not have a traffic accident exceeding the preset severity level. At this time, only the camera needs to be kept in the snapshot mode.

In an embodiment, determining whether the electric bicycle has a traffic accident and whether a traffic accident evaluation level corresponding to the traffic accident is greater than a preset level according to attitude information of the electric bicycle and a state of the helmet comprehensively. And the state of the helmet includes landing state. And respectively deal with different situations, when the electric bicycle is in a dumping state for a longer period of time or the helmet is in the landing state for a longer period of time, a command is immediately sent to the selected operation and maintenance people for timely processing, thereby improving the operation and maintenance management efficiency of the electric bicycle.

At least one embodiment of the present disclosure, the step S54 further includes the following steps:

In step S541, when the electric bicycle is in a tipped state and the vertical distance is less than the preset threshold value, determining that the electric bicycle is in a serious traffic accident level and sending the environment image information recorded by the camera in the fourth preset period of time and a third warning command to a second target object.

In at least one embodiment, when the electric bicycle is in a tipped state and the vertical distance is less than the preset threshold value at the same time, that is, when the body of the electric bicycle is in a tipped state for a longer period of time and the helmet is in a landing state for a longer period of time, in a preferred embodiment, it can be determined that the electric bicycle is in a serious traffic accident by detecting whether the helmet is in a wearing state or not, and when the helmet is in a wearing state and the helmet is in a landing state. At this time, the environment image information recorded by the camera in the fourth preset period of time and the third warning command can be sent to the second target object.

At least one embodiment of the present disclosure, the step S3 further includes the following steps:

In step S301, when the environment image information does not have a preset traffic accident image, acquiring an angle change rate of the helmet detected by an inclination detection device and obtaining a speed change rate of the electric bicycle, and determining whether the angle change rate is greater than a first preset threshold value in a first predetermined period of time, and determining whether the speed change rate of the electric bicycle is greater than a second preset threshold value in a second predetermined period of time.

In step S302, determining that the electric bicycle is at a serious traffic accident level when the angle change rate is greater than the first preset threshold value within the first predetermined period of time or the speed change rate of the electric bicycle is greater than the second preset threshold value within the second predetermined period of time, and sending environment image information recorded by the camera within a predetermined period of time and a third warning command to the second target object.

In step S303, returning to step S301 when the angle change rate is less than the first preset threshold value within the first predetermined period of time and the speed change rate of the electric bicycle is less than the second preset threshold value within the second predetermined period of time.

Likewise, when there is no preset traffic accident image in the environment image information, the user of the electric bicycle may or may not have a traffic accident. The embodiment of the present disclosure provides another detection method, in particular, the method includes acquiring the angle change rate of the helmet by the tilt angle detection device of the helmet, obtaining the speed change rate of the electric bicycle and determining whether the angle change rate is greater than the first preset threshold value within the first predetermined period of time, and determining whether the speed change rate of the electric device is greater than the second preset threshold value within the second predetermined period of time. It can be understood that in case of serious traffic accident, that is, the angle of the helmet of the electric bicycle and the speed of the electric bicycle change greatly in a short period of time after the electric bicycle is violently impacted. At this time, whether the electric bicycle has serious traffic accident can be determined by the angle change rate and speed change rate.

When any one of the angular change rate being greater than the first preset threshold value within the first predetermined period of time (e.g., 1 second) and the speed change rate of the electric bicycle being greater than the second preset threshold value within the second predetermined period of time (e.g., 2 seconds) is established, determining that the electric bicycle is at a serious traffic accident level, and sending the environmental image information recorded by the camera within the predetermined period of time and a third warning command to the second target. The second target object can be one or more of a background management system, selected operation and maintenance personnel, a rider corresponding to the electric bicycle, and a medical system. The third warning command may be an alarm command sent to the second target object, the accident severity level, and the current position and time of the electric bicycle. So as to realize rapid response and carry out relevant treatment on the electric bicycle and users in case of traffic accidents.

In addition, when the angle change rate is less than the first preset threshold value within the first predetermined period of time and the speed change rate of the electric bicycle is less than the second preset threshold value within the second predetermined period of time, it indicates that the electric bicycle has not experienced a traffic accident or the electric bicycle has experienced a minor traffic accident, the method returning to the step S301 to continue the subsequent detection.

At least one embodiment, after the step S3, the method further includes the steps of:

In step S31, when the environment image information does not have a preset traffic accident image, determining whether the environment image information has a target obstacle or not.

In step S32, adjusting the first preset time interval to a second preset time interval when the target obstacle is present in the environment image information. The second preset time interval is less than the first preset time interval.

It should be noted that when there is no preset traffic accident image in the environmental image information, it is not sure whether the user wearing the helmet have a traffic accident, the user wearing the helmet it determines that there may have a target obstacle, such as a large truck, a building, etc., between the electric bicycle and the position where the traffic accident occurred, or the user only pays a little attention to the traffic accident for a while. In order to detect whether the traffic accident occurred in this situation as much as possible, the embodiment performs further processing on the environmental image information. The method further includes determines determining whether the environmental image information has a target obstacle, and the target obstacle can be set in advance, such as a large truck or a building. The image identification/detection algorithm is already very mature, and it is not described too much here. For example, the method can determine whether there is a target obstacle in the current environment image information by performing an image matching algorithm, or, in other embodiments, the method can determine whether a tag corresponding to the current environment image information contains a target obstacle by means of deep learning, for example, using the YOLO V5 model, and using the current environment image information and the YOLOV5 model obtained by pre-training.

At one embodiment, adjusting the first preset time interval to a second preset time interval when the target obstacle is present in the environmental image information. In other words, the camera will detect at a higher frequency when the target obstacle is present to determine whether a user has captured a traffic accident image during riding. As a specific example, the first preset time interval may be set as 2 seconds, and the second preset time interval may be set as 0.6 second.

Further, after the step S32, the method further includes the following step s:

In step S33, determining whether the corresponding environment image information has a target obstacle from a third time node at the end of the fifth preset period of time after the first detection of the target obstacle.

In step S34, adjusting the second preset time interval to the first preset time interval when the environment image information does not have the target obstacle.

In step S35, maintaining the camera to continue capturing images according to the second predetermined time interval when the environmental image information has the target obstacle.

In this embodiment, in order to avoid the situation that the user does not detect an obstacle for a long time and does not detect a traffic accident during riding, and this situation can cause the camera to be in a high-frequency detection mode. On the one hand, excessive useless images are detected by the camera, on the other hand, the invalid workload of the camera is increased, and the service life of the camera is reduced. The present embodiment determines whether the corresponding environment image information has the target obstacle from the third time node at the end of the fifth preset period of time (e.g., 30 seconds) after the first detection of the target obstacle, and adjusts the second preset time interval to the first preset time interval when the environment image information does not have the target obstacle. That is, switching the camera back to a low frequency detection mode after the camera has not captured the target obstacle for a long time. And maintaining the camera to continue capturing images according to the second predetermined time interval when the environmental image information has the target obstacle.

At least one embodiment, after the step S4, the method further includes the following steps:

In step S401, obtaining historical position data of the electric bicycle for a sixth preset period of time prior to the current moment and determining a vector motion path of the electric bicycle based on the historical position data.

In step S402, determining whether there is a target shared vehicle behind the electric bicycle and within a preset range from the current position of the electric bicycle, according to the current position of the electric bicycle at the current moment and the vector motion path. The target shared vehicle is in communication connection with the electric bicycle.

In step S403, sending a fourth warning command to the target shared vehicle in response that the target shared vehicle is behind the current electric bicycle and was located in an area within the preset range from the current position.

Notably, in this embodiment, after it is determined that the environmental image information has the preset traffic accident image, in order to give a reminder and a warning to a vehicle behind the electric bicycle. The method of the embodiment obtains the historical position data of the electric bicycle within a sixth preset period of time and determines the vector motion path of the electric bicycle according to the historical position data. For example, obtaining the historical position data within 3 seconds before the current moment, thereby defining a driving direction of the electric bicycle at the current moment, and further determines the vehicles in the area behind the current electric bicycle and within the preset range from the current position through the driving direction. For example, the electric bicycle within a range of 50 meters behind the current bicycle sends the fourth warning command. The target shared vehicle and the electric bicycle can be communicatively connected, for example, vehicles of the same vehicle type, or vehicles which can establish communication connections between different vehicle types can be set as the target shared vehicle. The fourth warning command may be sent to the target shared vehicle to decrease the speed or to detour, etc. In this way, the rear vehicles can be alerted in advance to improve the safety of traffic travel.

Further, the "select operation and maintenance people" in step S55 is obtained by:

In step S551, obtaining a real-time position of the electric bicycle, and obtaining an operation and maintenance task of a plurality of alternate operation and maintenance people whose distance from the real-time position is within a preset range according to the real-time position of the electric bicycle, and a distance between the alternate operation and maintenance people and the real-time position.

In step S552, determining at least one alternate operation and maintenance people whose distance is within the preset range and the task of the alternate operation and maintenance people is less than a preset amount of task from the plurality of alternate operation and maintenance people as the selected operation and maintenance people.

In step S553, randomly selecting one of the at least one alternate operation and maintenance people as the selected operation and maintenance people if the number of the determined operation and maintenance people is plural.

It is worth noting that through the embodiment, the space distance between the electric bicycle and the operation and maintenance people is taken into consideration, and the amount of the task of each operation and maintenance people is taken into account at the same time. And determining at least one alternate operation and maintenance people whose distance is within the preset range and the task of the alternate operation and maintenance people is less than a preset amount of task from the plurality of alternate operation and maintenance people as the selected operation and maintenance people, and randomly selecting one of the at least one alternate operation and maintenance people as the selected operation and maintenance people if the number of the determined operation and maintenance people is plural. So as to ensure that a better candidate operation and maintenance people is selected, thereby improving the management efficiency of the electric bicycle and shortening the disposal time as much as possible.

The present disclosure also provides an electric bicycle which includes a body, a helmet and a control system installed in the body. The body is also provided with a tilt angle sensor for detecting attitude information of the electric bicycle, the tilt angle sensor is electrically connected with the control system, the helmet is provided with a communication device that is used to establish communication with the control system, and a camera for acquiring riding environment images that is equipped in front of the helmet. The control system includes a storage device, a processor, and a computer program stored in the storage device and capable of running on the processor, and when the processor executes the computer program, the method for detecting the traffic accidents based on helmet of the electric bicycle is implemented.

The foregoing is merely a preferred embodiment of the present disclosure and is not therefore limited in the scope of the present disclosure. Equivalent structural or equivalent flow changes made using the description of the present disclosure and the accompanying drawings, or direct or indirect application in other related technical fields, are likewise included in the scope of the present disclosure.

A person skilled in the art knows that the present application is not limited to the details of the above exemplary embodiments, and that the present application can be implemented in other specific forms without departing from the spirit or basic features of the application. Therefore, the above-mentioned embodiments of the present application should be regarded as exemplary and non-limiting from any point of view. The scope of the present application is defined by the appended claims rather than the above description. All changes that come within the meaning and scope of equivalents of the claims are encompassed by this application.

What is claimed is:

1. A method for detecting traffic accident using a helmet of an electric bicycle, the method comprising:
   acquiring real-time state information of the electric bicycle and determining whether the electric bicycle is in a started state according to the real-time state information;
   controlling a camera mounted on a front of the helmet of the electric bicycle to enter a snapshot mode and acquiring environment image information captured by the camera according to a first preset time interval in response that the electric bicycle is in the started state;
   determining whether the environment image information comprises a preset traffic accident image;
   in response that the environment image information comprises the preset traffic accident image, controlling the camera to enter a first video recording mode, and sending the environment image information of a first preset period of time recorded by the camera and/or a first warning command to a first target object after waiting for the first preset period of time;
   in response that the environment image information does not have the preset traffic accident image, determining whether the environment image information has a target obstacle or not; and
   adjusting the first preset time interval to a second preset time interval when the target obstacle is present in the environment image information, and the second preset time interval is less than the first preset time interval.

2. The method according to claim 1, wherein controlling the camera to enter the first video recording mode, and sending the environment image information of the first preset period of time recorded by the camera and/or the first warning command to the first target object after waiting for the first preset period of time further comprises:
   determining a traffic accident evaluation level corresponding to the preset traffic accident image according to the preset traffic accident image;
   determining whether the traffic accident evaluation level is greater than a preset severity level;
   in response that the traffic accident evaluation level is greater than the preset severity level, controlling the camera to enter the first video recording mode and obtaining a current speed of the electric bicycle and a separation distance between the electric bicycle and a position of the traffic accident;
   determining a theoretical calculation period of time of the electric bicycle when the electric bicycle moves from a current position to the position of the traffic accident and setting the theoretical calculation period of time as a first preset period of time; and
   after waiting for the first preset period of time, sending to the first target object the environmental image information recorded by the camera in the first preset period of time, the traffic accident evaluation level and the current position of the electric bicycle;
   in response that the traffic accident evaluation level is less than or equal to the preset severity level, controlling the camera to enter the first video recording mode and recording an environment image information video that is obtained by the camera within a second preset period of time after entering the first video recording mode, and determining whether an environment information node video corresponding to a first time node at the end of the second preset period of time has the preset traffic accident image;
   in response that the environment image information node video corresponding to the first time node at the end of the second preset period of time has the preset traffic accident image, adjusting the second preset period of time to a third preset period of time and setting the third preset period of time as the first preset period of time;
   after waiting for the first preset period of time, sending to the first target object the environmental image information recorded by the camera in the first preset period of time, the traffic accident evaluation level and the current position of the electric bicycle.

3. The method according to claim 2, wherein the method further comprising:
   acquiring a real-time running speed of the electric bicycle, and determining whether the electric bicycle is in a static state according to the real-time running speed in response that the environment image information does not have the preset traffic accident image;
   in response that the electric bicycle is in the static state, acquiring attitude information of the electric bicycle detected by a tilt angle detection device of the electric bicycle and obtaining a vertical distance between the camera and ground;
   determining whether the electric bicycle is in a tipped state according to the attitude information of the electric bicycle and determining whether the vertical distance is less than a preset threshold value;
   controlling the camera to enter a second video recording mode in response that the electric bicycle is in the tipped state, or the vertical distance is less than the preset threshold value;
   obtaining environmental image information video recorded by the camera within a fourth preset period of time after the camera entering the second video recording mode, and determining whether the electric bicycle is in the tipped state and whether the vertical distance between the camera and the ground is less than the preset threshold value at a second time node at the end of the fourth preset period of time;
   sending the obtained environmental image information video and/or a second warning command to a selected operation and maintenance people in response that the electric bicycle is in the tipped state or the vertical distance is less than the preset threshold value;

maintaining the camera in the snapshot mode in response that the electric bicycle is not in the tipped state and the vertical distance is greater than or equal to the preset threshold value.

4. The method according to claim 2, wherein the method further comprising:

in response that the environment image information does not have the preset traffic accident image, acquiring an angle change rate of the helmet detected by an inclination detection device and obtaining a speed change rate of the electric bicycle;

determining whether the angle change rate is greater than a first preset threshold value in a first predetermined period of time, and determining whether the speed change rate of the electric bicycle is greater than a second preset threshold value in a second predetermined period of time;

determining that the electric bicycle is at a serious traffic accident level in response that the angle change rate is greater than the first preset threshold value within the first predetermined period of time or the speed change rate of the electric bicycle is greater than the second preset threshold value within the second predetermined period of time, and sending environment image information recorded by the camera within a predetermined period of time and a third warning command to a second target object;

in response that the angle change rate is less than the first preset threshold value within the first predetermined period of time and the speed change rate of the electric bicycle is less than the second preset threshold value within the second predetermined period of time, continuing to acquire the angle change rate of the helmet detected by an inclination detection device and obtain the speed change rate of the electric bicycle.

5. The method according to claim 1, wherein the method further comprising:

determining whether a corresponding environment image information has a target obstacle from a third time node at the end of a fifth preset period of time after a first detection of the target obstacle;

adjusting the second preset time interval to the first preset time interval in response that the environment image information does not have the target obstacle; and maintaining the camera to continue capturing images according to the second preset time interval in response that the environmental image information has the target obstacle.

6. The method according to claim 1, wherein the method further comprising:

obtaining historical position data of the electric bicycle for a sixth preset period of time prior to a current moment and determining a vector motion path of the electric bicycle based on the historical position data;

determining whether there is a target shared vehicle behind the electric bicycle and within a preset range from a current position of the electric bicycle according to the current position of the electric bicycle at the current moment and the vector motion path; wherein target shared vehicle is in communication connection with the electric bicycle; and sending a fourth warning command to the target shared vehicle in response that the target shared vehicle is behind the current electric bicycle and within the preset range from the current position.

7. The method according to claim 3, wherein the operation and maintenance people is selected by:

obtaining a real-time position of the electric bicycle, and obtaining an operation and maintenance task from each of a plurality of alternate operation and maintenance people whose distance from the real-time position is within a preset range according to the real-time position of the electric bicycle, and a plurality of distances between the alternate operation and maintenance people and the real-time position;

determining at least one alternate operation and maintenance people whose distance is within the preset range and the task of the alternate operation and maintenance people is less than a preset amount of task from the plurality of alternate operation and maintenance people as the selected operation and maintenance people; and randomly selecting one of the at least one alternate operation and maintenance people as the selected operation and maintenance people if the number of the determined operation and maintenance people is plural.

8. An electronic bicycle comprising:

a body;

a helmet;

and a control system installed in the body;

wherein the body is also provided with a tilt angle sensor for detecting attitude information of the electric bicycle and the tilt angle sensor is electrically connected with the control system;

the helmet is provided with a communication device that is used to establish communication with the control system and a camera for acquiring riding environment images that is equipped in front of the helmet;

the control system comprises a storage device;

a processor; and the storage device storing one or more programs, which when executed by the at least one processor, cause the at least one processor to:

acquire real-time state information of the electric bicycle and determine whether the electric bicycle is in a started state according to the real-time state information;

control a camera mounted on a front of the helmet of the electric bicycle to enter a snapshot mode and acquire environment image information captured by the camera according to a first preset time interval in response that the electric bicycle is in the started state;

determine whether the environment image information comprises a preset traffic accident image;

in response that the environment image information comprises the preset traffic accident image, control the camera to enter a first video recording mode, and send the environment image information of a first preset period of time recorded by the camera and/or a first warning command to a first target object after waiting for the first preset period of time;

in response that the environment image information does not have the preset traffic accident image, determine whether the environment image information has a target obstacle or not; and adjust the first preset time interval to a second preset time interval when the target obstacle is present in the environment image information, and the second preset time interval is less than the first preset time interval.

9. The electronic bicycle according to claim 8, wherein the processor controls the camera to enter the first video recording mode and send the environment image information of the first preset period of time recorded by the camera and/or the first warning command to the first target object after waiting for the first preset period of time by:
- determining a traffic accident evaluation level corresponding to the preset traffic accident image according to the preset traffic accident image;
- determining whether the traffic accident evaluation level is greater than a preset severity level;
- in response that the traffic accident evaluation level is greater than the preset severity level, controlling the camera to enter the first video recording mode and obtaining a current speed of the electric bicycle and a separation distance between the electric bicycle and a position of the traffic accident;
- determining a theoretical calculation period of time of the electric bicycle when the electric bicycle moves from a current position to the position of the traffic accident and setting the theoretical calculation period of time as a first preset period of time; and
- after waiting for the first preset period of time, sending to the first target object an environmental image information recorded by the camera in the first preset period of time, the traffic accident evaluation level and the current position of the electric bicycle;
- in response that the traffic accident evaluation level is less than or equal to the preset severity level, controlling the camera to enter the first video recording mode and recording an environment information video that is obtained by the camera within a second preset period of time after entering the first video recording mode, and determining whether the environment image information node video corresponding to a first time node at the end of the second preset period of time has the preset traffic accident image;
- in response that the environment image information node video corresponding to the first time node at the end of the second preset period of time has the preset traffic accident image, adjusting the second preset period of time to a third preset period of time and setting the third preset period of time as the first preset period of time;
- after waiting for the first preset period of time, sending to the first target object the environmental image information recorded by the camera in the first preset period of time, the traffic accident evaluation level and the current position of the electric bicycle.

10. The electronic bicycle according to claim 9, wherein the processor is further caused to:
- acquire a real-time running speed of the electric bicycle, and determine whether the electric bicycle is in a static state according to the real-time running speed in response that the environment image information does not have the preset traffic accident image;
- in response that the electric bicycle is in the static state, acquire attitude information of the electric bicycle detected by a tilt angle detection device of the electric bicycle and obtain a vertical distance between the camera and ground;
- determine whether the electric bicycle is in a tipped state according to the attitude information of the electric bicycle and determine whether the vertical distance is less than a preset threshold value;
- control the camera to enter a second video recording mode in response that the electric bicycle is in the tipped state, or the vertical distance is less than the preset threshold value;
- obtain environmental image information video recorded by the camera within a fourth preset period of time after the camera entering the second video recording mode, and determine whether the electric bicycle is in the tipped state and whether the vertical distance between the camera and the ground is less than the preset threshold value at a second time node at the end of the fourth preset period of time;
- send the obtained environmental image information video and/or a second warning command to a selected operation and maintenance people in response that the electric bicycle is in the tipped state or the vertical distance is less than the preset threshold value;
- maintain the camera in the snapshot mode in response that the electric bicycle is not in the tipped state and the vertical distance is greater than or equal to the preset threshold value.

11. The electronic bicycle according to claim 9, wherein the processor is further caused to:
- in response that the environment image information does not have the preset traffic accident image, acquire an angle change rate of the helmet detected by an inclination detection device and obtain a speed change rate of the electric bicycle;
- determine whether the angle change rate is greater than a first preset threshold value in a first predetermined period of time, and determine whether the speed change rate of the electric bicycle is greater than a second preset threshold value in a second predetermined period of time;
- determine that the electric bicycle is at a serious traffic accident level in response that the angle change rate is greater than the first preset threshold value within the first predetermined period of time or the speed change rate of the electric bicycle is greater than the second preset threshold value within the second predetermined period of time, and send environment image information recorded by the camera within a predetermined period of time and a third warning command to a second target object;
- in response that the angle change rate is less than the first preset threshold value within the first predetermined period of time and the speed change rate of the electric bicycle is less than the second preset threshold value within the second predetermined period of time, continue to acquire the angle change rate of the helmet detected by an inclination detection device and obtain the speed change rate of the electric bicycle.

12. The electronic bicycle according to claim 8, wherein the processor is further caused to:
- determine whether a corresponding environment image information has a target obstacle from a third time node at the end of a fifth preset period of time after a first detection of the target obstacle;
- adjust the second preset time interval to the first preset time interval in response that the environment image information does not have the target obstacle; and
- maintain the camera to continue capturing images according to the second preset time interval in response that the environmental image information has the target obstacle.

13. The electronic bicycle according to claim 8, wherein the processor is further caused to:
- obtain historical position data of the electric bicycle for a sixth preset period of time prior to a current moment and determining a vector motion path of the electric bicycle based on the historical position data;
- determine whether there is a target shared vehicle behind the electric bicycle and within a preset range from a current position of the electric bicycle according to the current position of the electric bicycle at the current moment and the vector motion path; wherein target shared vehicle is in communication connection with the electric bicycle; and send a fourth warning command to the target shared vehicle in response that the target shared vehicle is behind the current electric bicycle and within the preset range from the current position.

14. The electronic bicycle according to claim 10, wherein wherein the operation and maintenance people is selected by:

obtaining a real-time position of the electric bicycle, and obtaining an operation and maintenance task from each of a plurality of alternate operation and maintenance people whose distance from the real-time position is within a preset range according to the real-time position of the electric bicycle, and a plurality of distances between the alternate operation and maintenance people and the real-time position;

determining at least one alternate operation and maintenance people whose distance is within the preset range and the task of the alternate operation and maintenance people is less than a preset amount of task from the plurality of alternate operation and maintenance people as the selected operation and maintenance people; and randomly selecting one of the at least one alternate operation and maintenance people as the selected operation and maintenance people if the number of the determined operation and maintenance people is plural.

\* \* \* \* \*